(12) United States Patent
Zhang et al.

(10) Patent No.: US 8,971,715 B2
(45) Date of Patent: Mar. 3, 2015

(54) APPARATUS AND METHODS OF DISPLAYING MESSAGES FOR ELECTRONIC DEVICES

(71) Applicants: Jingxi Zhang, Foster City, CA (US); Yang Zhang, Foster City, CA (US)

(72) Inventors: Jingxi Zhang, Foster City, CA (US); Yang Zhang, Foster City, CA (US)

(*) Notice: Subject to any disclaimer, the term of this patent is extended or adjusted under 35 U.S.C. 154(b) by 159 days.

(21) Appl. No.: 13/831,901

(22) Filed: Mar. 15, 2013

(65) Prior Publication Data

US 2014/0270792 A1   Sep. 18, 2014

(51) Int. Cl.
*H04B 10/00* (2013.01)
*H04B 10/116* (2013.01)

(52) U.S. Cl.
CPC .................................. *H04B 10/116* (2013.01)
USPC ............................ 398/118; 398/128; 398/130

(58) Field of Classification Search
USPC .................................. 398/118, 127–128, 130
See application file for complete search history.

(56) References Cited

U.S. PATENT DOCUMENTS

| | | | |
|---|---|---|---|
| 2008/0240031 A1* | 10/2008 | Nassiri-Toussi et al. | 370/329 |
| 2013/0278176 A1* | 10/2013 | Shimomura et al. | 315/297 |
| 2014/0035481 A1* | 2/2014 | Peting et al. | 315/291 |
| 2014/0036168 A1* | 2/2014 | Ludwig | 349/12 |
| 2014/0267798 A1* | 9/2014 | McCarthy | 348/207.1 |

* cited by examiner

*Primary Examiner* — Dzung Tran

(57) ABSTRACT

An apparatus of transmitting messages from an electronic device and display it on a mobile device, and a method of doing the same are disclosed. An exemplifying electronic device has an encoder to encode the data and a drive to modulate the signals into temporal and spatial light patterns according to the transmitted message. The light signals are then emitted from a group of LEDs on the electronic device. A video camera on a mobile device captures the light signals in the form of temporal and spatial patterns. A software application decodes the message and displays the message on the mobile device screen.

26 Claims, 6 Drawing Sheets

APPARATUS AND METHODS OF DISPLAYING MESSAGES FOR ELECTRONIC DEVICES

TECHNICAL FIELD

This present invention relates in general to the field of information transmission to mobile devices, and more specifically, to the technique of driving indicator lights to deliver messages from an electronic device to a mobile device.

DISCUSSION OF RELATED ART

Many devices need to indicate its status or properties to the user. The methods to present a device's static properties have been developed, such as linear barcodes and 2-dimensional barcodes (U.S. Pat. No. 4,939,354, U.S. Pat. No. 5,053,609, U.S. Pat. No. 5,124,536, U.S. Pat. No. 5,726,435). Users can use a mobile device software application to capture the barcode pattern through its video camera and decode the message.

However, besides static properties, many electronic devices need to dynamically show messages about its operating condition and alert users of error conditions. Due to limited device front panel space or restricted costs, a message is often delivered using one or more indicator lights, for example, lighting or blinking several small light bulbs or Light Emitting Diodes (LEDs). The simple indicator lights cannot provide detailed information to the user. A more sophisticated optical data communication method may be used to deliver detailed messages to the user.

Methods for visible light communication have been used for transmitting messages (US patent 2008/0131140A1, US patent 2009/0269073A1, US patent 2009/0310971A1, US patent 2010/0196018A1, US patent 2010/0284697A1, US patent 2010/0327780A1, US patent 2011/0243570A1, US patent 2012/0091896A1, US patent 2012/0269520A1). A method to transfer the visible light pattern through optical cables is also described (US patent 2011/0052195A1). However, these methods require dedicated light sensors or optical cables to receive the data.

An electronic device or equipment usually needs to present messages to the user, either in normal operation or in fault condition. For example, electrical powered equipment needs to indicate whether its power supply is in good condition or in a failure mode. An automobile needs to report its mechanical and electrical condition to the driver. Due to limited front panel space on a device or restricted costs, a message is usually delivered by a few simple indicator lights, such as lighting or blinking of small light bulbs or Light Emitting Diodes (LEDs). However, such simple mechanisms may not provide clear and detailed information for the device. For example, a simple blinking light on a network router cannot provide users with detailed information about its network address, its software version or its network conductivity, which are essential to the user in setup and configuration processes. In particular, normal means of accessing device information over a network connection becomes non-functional during troubleshooting.

Adding an alphanumerical display panel to electronic devices is costly and sometime is prohibited by the limited front panel space. Most devices use LEDs or other light indicators to alert the user of working condition or errors. Some devices use a special electronic port to connect to a dedicated monitoring device to retrieve the device's information. For example, most modem motor vehicles use an electronic processor to monitor and diagnose the mechanical and electrical problems of the vehicle. However, to retrieve the Diagnostic Trouble Code (DTC) from the vehicle, one needs a special device to connect to the vehicle's On-Board Diagnostics (OBD) port. The process of getting the vehicle DTC is cumbersome and requires a trained mechanical specialist to perform. It is highly desirable if an ordinary motor vehicle driver can simply point the video camera of a mobile device to the LED lights flashing on the dashboard and read out the fault cause and recommended repair steps. The indicator lights serve both an alerting signal for quick visual assessment of the device condition and as the light transmitters to deliver detailed data to a mobile device for message retrieval and display.

Therefore, there is a need for an apparatus and thereof method to display the dynamical information with the current compatible mobile devices.

SUMMARY

Consistent with embodiments of the present invention, an apparatus for displaying messages from a data source is provided. In some embodiments, the apparatus comprises an electronic device configured to convert signals from the data source to an array of optical signals, the electronic device comprising a data collector module collecting data from the data source, an encoder module generating encoded signals according to the received data source signals, a drive module receiving the encoded signals, and a plurality of light emitting devices being powered and modulated by the drive module according the encoded signals; and a mobile device configured to process video imaging, comprising: a camera receiving the emitted signals from the plurality of light emitting devices, a decoder decoding the video signals, and a display drive module sending the decoded signals to a display screen.

In some embodiment, the drive module drives the plurality of light emitting devices to produce a temporal pulse sequence of signals. In another embodiment, the drive module drives the plurality of light emitting devices and produces spatial patterns of signals comprising a single signal, a linear array signal, or two dimensional array signals.

Consistent with some embodiments of the present invention, a method of displaying messages from a data source on a mobile device comprises: collecting data from the data source by a data collector in the electronic device; encoding the data to generate modulated control signals according to the collected data from the data source; driving a plurality of light emitting devices to emit optical signals with the modulated control signals, wherein the optical signals comprise a temporal sequence, a spatial array patterns, and a combination of temporal sequence and spatial patterns; providing a video imaging device on the mobile device; recording the optical signals on the video imaging device; decoding the optical signals with a decoder in the mobile device; converting the decoded data into a human readable message; and displaying the message on a display screen on the mobile device.

Another embodiment of the method comprises providing a wireless network controller configured to access internet-provided reference information and to convert the information to human readable messages on the display screen.

Another embodiment of the method comprises providing a clock generator configured to create clock reference signals, wherein the clock reference signals are transmitted in a separate stream from the encoded data from the data collector and are sent to a light emitter such as a LED from a clock light driver.

Another embodiment of the method further provides a clock generator configured to create clock reference signals, wherein the clock reference signals are intertwined with the encoded signals and displayed on the plurality of light emitting devices.

Consistent with another embodiment of the present invention, an apparatus for transmitting data from a data source to a video camera, comprises of an electronic device configured to convert data from the data source to an array of optical signals, the electronic device comprising: a data collector module collecting data from the data source, an encoder module generating encoded signals according to the received data from the data source, a drive module receiving the encoded signals, and a plurality of light emitting devices being powered and modulated by the drive module according the encoded signals, wherein the modulating rate is less than half of the video camera frame rate.

DETAILED DESCRIPTION

The present invention describes an apparatus and a method thereof to enhance the message delivery mechanism from indicator lights. The method can apply to an indicator light or a group of indicator lights. In the case of a group of indicator lights, the indicator lights form a linear array or a 2-dimensional matrix. The internal message of a device is coded in a sequence of control signals to modulate the current or voltage applied to the indicator lights. As a result, each indicator light temporally varies its light intensity or color. The group of the indicator lights also presents a spatial pattern. A video camera, which is commonly found in a mobile device or a personal computer, is used to capture the temporal and spatial light patterns emitted from the light indicators. A software application decodes the message and displays the resulting information on the mobile device's screen. The software application can also automatically query for relevant information from the external data sources such as a local database or a remote Internet-accessible database through the mobile wireless connectivity and augments the display with more comprehensive information.

Figure 1:
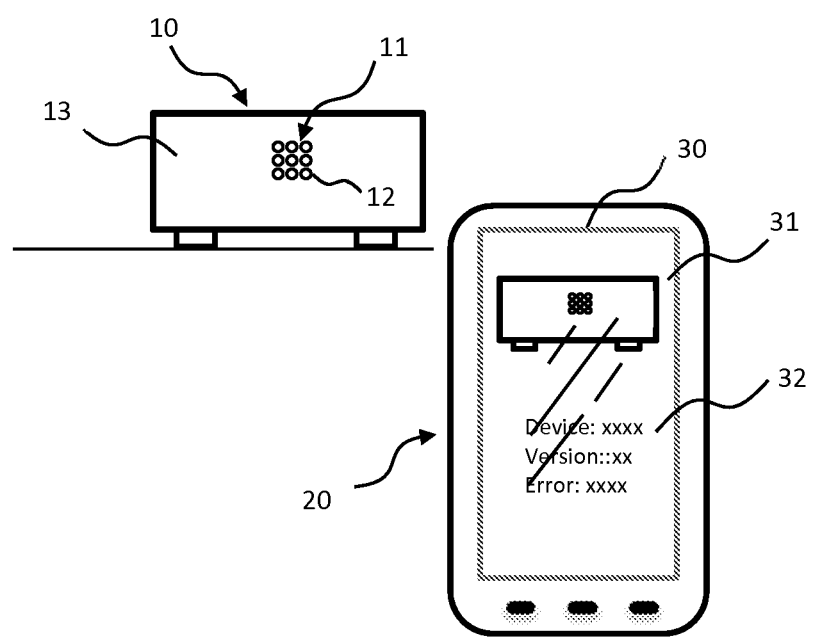
FIG. 1 illustrates a mobile device capturing light patterns emitted from an electronic device's front panel indicator and displaying the delivered message.
Figure 2:
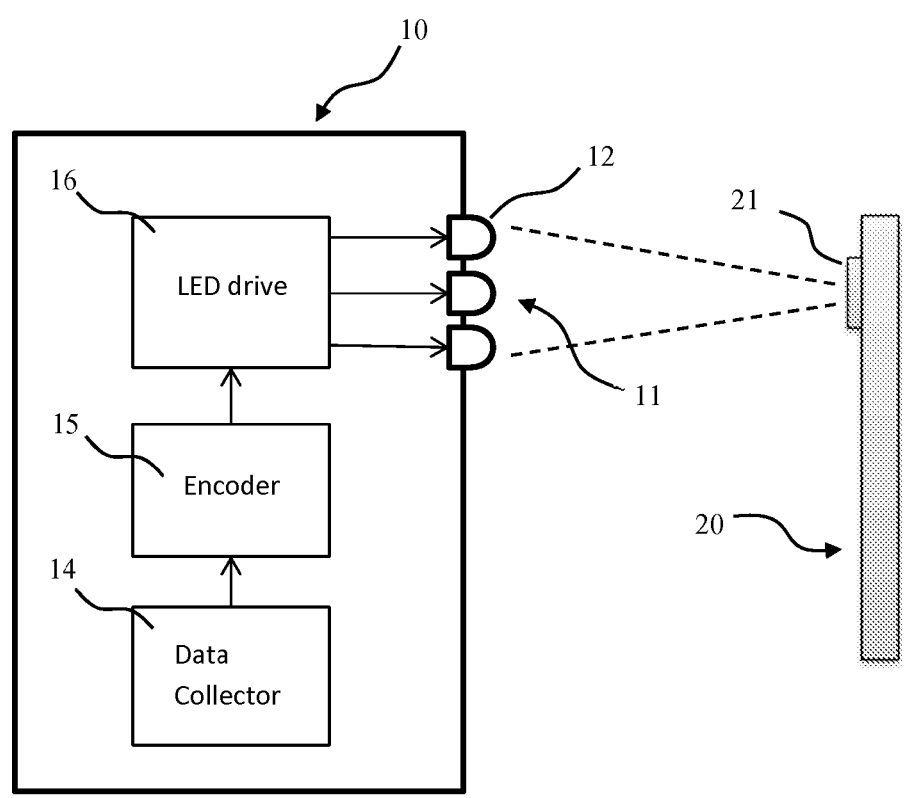
FIG. 2 exemplifies the process to encode a message and transmit light at the electronic device.

One embodiment of the invention is illustrated in FIGS. 1 and 2. A group of light sources such as LEDs is organized in a 2-dimensional array 11 on front panel 13 of electronic device 10. A LED drive circuit 16 depicted in FIG. 2 modulates the current of each LED 12 in the LED array 11, therefore changes the light intensity emitted from LED 12. A mobile device 20, such as a smart phone, an iPhone, an iPad, a Blueberry, or a personal computer, is used to capture the temporal and spatial light patterns through the embedded video camera 21 in FIG. 2. The captured video 31 is displayed onto the mobile device screen 30 for aiming and targeting purposes. A decoding process implemented in the mobile device 20, described later, recovers the captured light patterns to a human readable message 32 and displays the message 32 on the mobile device screen 30.

An alternative embodiment can use multicolor LEDs in the LED array 11 implementation. The LED color and light intensity can be combined to enhance the information transmission throughput.

FIG. 2 exemplifies the process to encode messages and transmit light at the electronic device 10 in the example embodiment. The system data collector 14 monitors the device condition and records all the data required for display. The data are encoded to a binary sequence at the encoder module 15. To minimize the average light density variation, DC-balanced encoding schemes, such as Manchester coding or 8b/10b coding, can be used. The encoded data are sent to the LED drive module 16. The output ports of LED drive module 16 are connected to individual LED lights 12 of the LED array 11 at the front panel of the device 10. The LED drive module 16 supplies electrical current to the LEDs 12. The electrical current delivered to each LED is modulated at the LED drive module 16 by the coded data sequence from the encoder module 15; therefore, light intensity emitted from LED 12 is modulated in time sequence, and meanwhile the entire LED array 11 presents a dynamic spatial pattern. A video camera 21 from the mobile device 20 is used to capture the modulated light emitted from the LED array 11. The LED modulation frequency should be lower than half of the camera 21 capturing frame rate according to the Nyquist sampling theorem.

Figure 3:
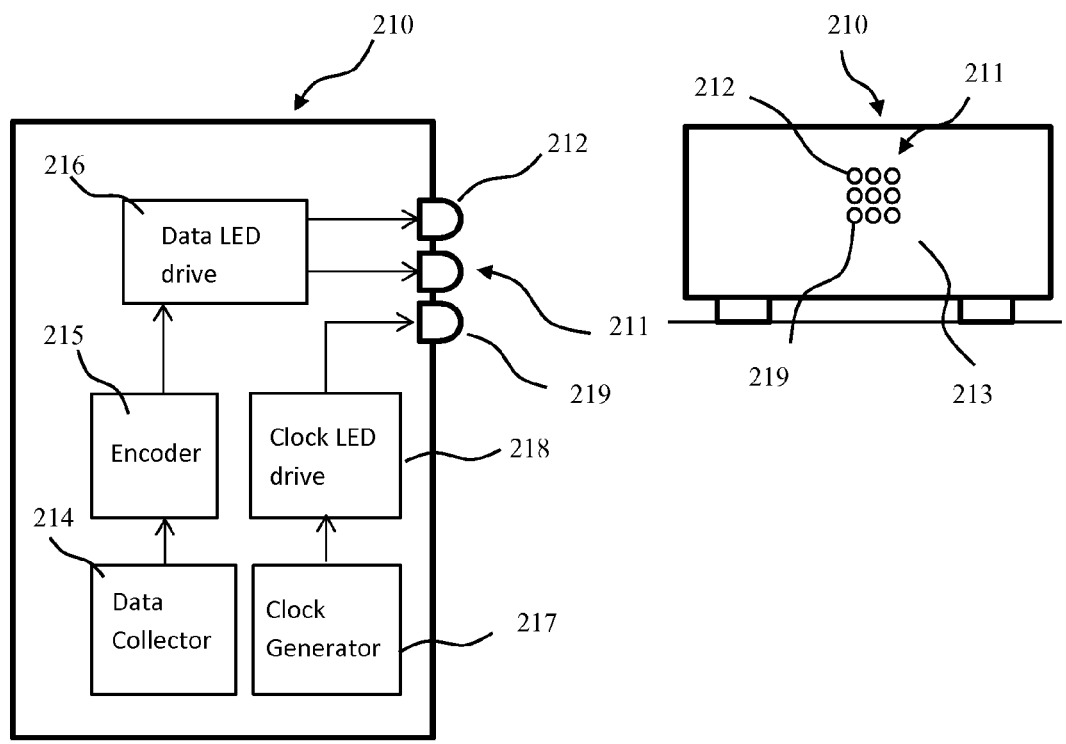
FIG. 3 depicts an exemplary embodiment having one reference clock.

To ensure the reliability of capturing the encoded data from the LED lights, one or few LEDs in the LED array can be modulated by the electrical current at a fixed frequency supplied by the LED drive module as the reference clock. FIG. 3 depicts an exemplary embodiment having one reference clock, displaying in a LED. The system data collector 214 in the electronic device 210 observes the device condition and records all the data required for display. The data are encoded to a binary sequence at the encoder module 215. The encoded data are sent to the data LED drive module 216. The output ports of data LED drive module 216 are connected to individual LED lights 212 of the LED array 211 except the reference clock LED 219 at the front panel 213 of the device 210. A reference clock generator 217 creates a periodical reference clock wave. The reference clock wave modulates clock LED 219 light emitting through the clock LED drive 218. The reference clock light wave emitted from LED 219 provides a timing reference to the receiving camera.

Figure 4:
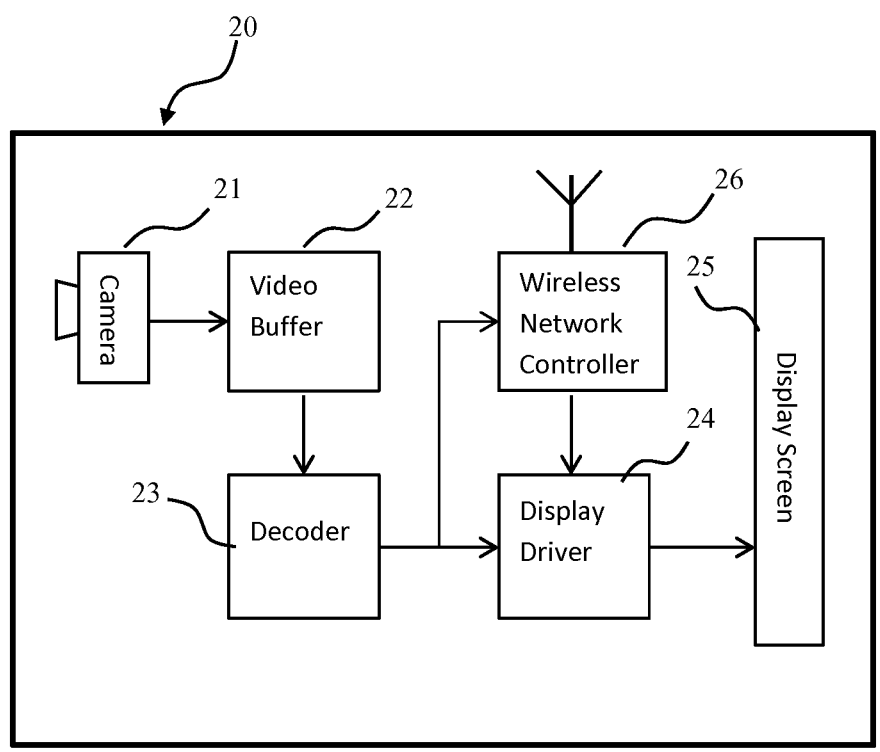
FIG. 4 shows the message decoding process in a mobile device.

FIG. 4 shows the message decoding process in a display device 20 (a mobile device, for example) The on-board video camera 21 captures the light pattern emitted from the LED array 11 on the electronic device 10 in FIG. 2. The captured video data are stored in the video frame buffer 22 and each video frame is forwarded to the decoder module 23. The original message sent from the electronic device 10 is recovered at the decoder module 23 by decoding the temporal and spatial light patterns using the corresponding decoding protocol. The decoded message is sent to the display driver 24 and presented on the display screen 25. Optionally, the decoded message from the decoder module 23 is sent in parallel to the wireless network controller 26. Through the wireless network controller 26 relevant information is retrieved from Internet-accessible data sources. The enriched information is fed back to the display driver 24 and added to the display screen 25 to provide the user with richer reference material.

Figure 5:
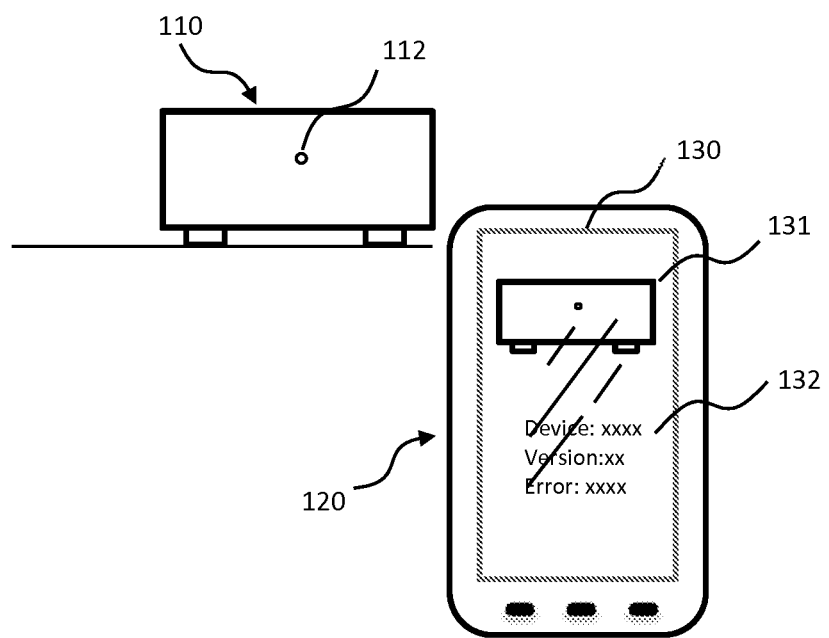
FIG. 5 demonstrates a mobile camera capturing and decoding a single light signal sequence from the device.

To simplify message transmission and lower building cost, a single LED 112 may be used to deliver data as shown in FIG. 5. In this embodiment the encoded sequence data from the electronic device 110 modulate the electrical current to the single LED 112. The video camera of the mobile device 120 captures the light emitted from the LED 112. The decoding process detects the temporal sequence data to recover the original message. The video image 131 of the LED and the recovered message 132 are superimposed on the mobile device screen 130. Because only a single LED is used, it takes a longer time to transmit LED light sequence and video capture time is longer too.

Another exemplary application of the invention is transmitting traffic information from regular traffic lights. Using the light modulation frequency higher than the frequency range perceivable by human eyes, the driver will not notice interference from the information transmission. A video camera with the light data decoding capability can deliver traffic information to the driver.

Figure 6:
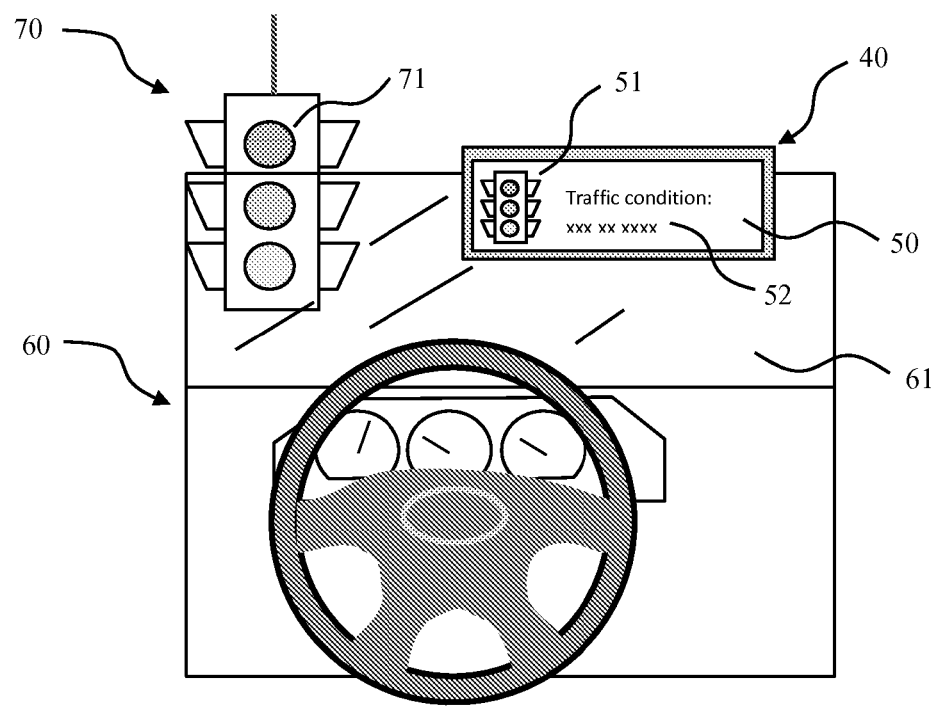
FIG. 6 depicts the exemplary application of the invention in traffic message delivery.

FIG. 6 shows an application example of the invention in traffic message delivery. In this example the traffic lights 70 are used for transmitting the traffic condition, road states and accident information to the driver in a motor vehicle 60. Nowadays, most light bulbs in traffic lights are replaced by LEDs or other energy saving emitters, meanwhile light emission can be easily modulated by an electrical pulse sequence. The encoded message is converted to an electrical pulse sequence and is sent to the LED lights 71 to modulate the light transmission. If the electrical pulses rate exceeds the frequency range perceivable by human eyes, 30 Hz approximately, the driver of the vehicle would not feel any flickering of the modulated traffic lights. A receiving device 40 with a video camera (not shown) mounted above the windshield 61 captures the emitting light pulses and decodes the message. The video image of the traffic light 51 and the traffic information 52 are displayed on the receiving device screen 50 or read aloud to the user.

Video camera-equipped smart phones and mobile devices are very popular nowadays. Using a mobile device's video camera to capture and display messages from electronic devices not only lowers the manufacturing cost of electronic devices, it also provides the user a simpler and more intuitive way to recognize equipment's conditions and to catch error messages.

The foregoing description is intended to illustrate but not to limit the scope of the invention, which is defined by the scope of the appended claims. Other embodiments are within the scope of the disclosure. Numerous variations and modifications within the scope of the present disclosure and the embodiments described therein are possible.

What is claimed is:

1. An apparatus for displaying messages from a data source, comprising:
   an electronic device configured to convert signals from the data source to an array of optical signals, the electronic device comprising:
   a data collector module collecting data from the data source, an encoder module generating encoded signals according to the received data from the data source, a drive module receiving the encoded signals, and a plurality of light emitting devices being powered and modulated by the drive module according the encoded signals; and
   a mobile device configured to process video imaging, comprising:
   a camera receiving the emitted signals from the plurality of light emitting devices, a decoder decoding the video signals, and a display drive module sending the decoded signals to a display screen.

2. An apparatus for displaying messages as in claim 1, wherein the drive module drives the plurality of light emitting devices to produce a temporal pulse sequence of signals.

3. An apparatus for displaying messages as in claim 2, wherein the temporal pulse sequence comprises binary pulses, or DC-balanced encoding (such as Manchester coding and 8b/10b coding).

4. An apparatus for displaying messages as in claim 1, wherein the drive module modulates the plurality of light emitting devices with analog light intensity modulation (AM), frequency modulation (FM), spectral modulation, chrome modulation, or phase modulation.

5. An apparatus for displaying messages as in claim 1, wherein the drive module drives the plurality of light emitting devices and produces spatial patterns of signals comprising a single signal, a linear array signal, or two dimensional array signals.

6. An apparatus for displaying messages as in claim 1, wherein the plurality of light emitting devices comprise light emitting diodes (LEDs), organic light emitting diodes (OLEDs), plasma lights, LCD with backlights, reflecting LCD display lights, micro-mirror light deflecting device (DLP), and a type of energy saving light source.

7. An apparatus for displaying messages as in claim 6, wherein the plurality of light emitting devices produce lights comprises visible light, inferred light, and ultraviolet light.

8. An apparatus for displaying messages as in claim 1, wherein the mobile device comprises a handheld device, a cell phone, a Smartphone, an iPhone, an iPad, an Android device, a personal computer, and a Blackberry.

9. An apparatus for displaying messages as in claim 1, the electronic device further comprising a clock generator configured to create clock reference signals, wherein the clock reference signals stay in separate streams from the encoded signals and are sent to a separate light emitter via a clock light driver.

10. An apparatus for displaying messages as in claim 1, the electronic device further comprising a clock generator configured to create clock reference signals, wherein the clock reference signals are embedded in the encoded signals from the data source.

11. An apparatus for displaying messages as in claim 1, the mobile device further comprising a video buffer module.

12. An apparatus for displaying messages as in claim 1, the mobile device further comprising a wireless network controller configured to retrieve relevant information from Internet-accessible data sources and to feed the information back to the display driver circuitry.

13. A method of displaying messages from a data source on a mobile device, comprising:
   collecting data from the data source by a data collector in the electronic device;
   encoding the data to generate modulated control signals according to the collected data from the data source;
   driving a plurality of light emitting devices to emit optical signals with the modulated control signals, wherein the optical signals comprise a temporal sequence, a spatial array patterns, and a combination of temporal sequence and spatial patterns;
   providing a video imaging device on the mobile device;
   recording the optical signals on the video imaging device;
   decoding the optical signals with a decoder in the mobile device;

converting the decoded data into a human readable message; and displaying the message on a display screen on the mobile device.

14. A method of displaying messages from a data source on a mobile device as in claim 13, wherein the video imaging device is embedded in the mobile device.

15. A method of displaying messages from a data source on a mobile device as in claim 13, further comprising providing a video buffer to store the collected signals.

16. A method of displaying messages from a data source on a mobile device as in claim 13, further comprising providing a wireless network controller configured to access internet-provided reference information and to convert the information to human readable messages on the display screen.

17. A method of displaying messages from a data source on a mobile device as in claim 13, further providing a clock generator configured to create clock reference signals, wherein the clock reference signals are transmitted in a separate stream from the encoded data from the data collector and are sent to a light emitter such as a LED from a clock light driver.

18. A method of displaying messages from a data source on a mobile device as in claim 13, further providing a clock generator configured to create clock reference signals, wherein the clock reference signals are intertwined with the encoded signals and displayed on the plurality of light emitting devices.

19. A method of displaying messages from a data source on a mobile device as in claim 13, the video imaging device comprising a digital camera.

20. An apparatus for transmitting data from a data source through light to video camera, comprising:

an electronic device configured to convert data from the data source to an array of optical signals, the electronic device comprising:

a data collector module collecting data from the data source, an encoder module generating encoded signals according to the received data from the data source, a drive module receiving the encoded signals, and a plurality of light emitting devices being powered and modulated by the drive module according the encoded signals, wherein the modulating rate is less than half of the video camera frame rate.

21. An apparatus for transmitting data as in claim 20, wherein the plurality of light emitting devices are driven to produce a temporal pulse sequence of signals.

22. An apparatus for transmitting data as in claim 21, wherein the temporal pulse sequence comprises binary pulses, or DC-balanced encoded (such as Manchester coding and 8b/10b coding) pulses.

23. An apparatus for transmitting data as in claim 20, wherein the plurality of light emitting devices are modulated by the drive module with analog light intensity modulation (AM), frequency modulation (FM), spectral modulation, chrome modulation, or phase modulation.

24. An apparatus for transmitting data as in claim 20, wherein the plurality of light emitting devices are driven by the drive module to produce spatial patterns of signals, the spatial patterns of signals comprising a single signal, a linear array signal, and two dimensional array signals.

25. An apparatus for transmitting data as in claim 20, wherein the plurality of light emitting devices comprise light emitting diodes (LEDs), organic light emitting diodes (OLEDs), plasma lights, LCD with backlights, reflecting LCD display lights, micro-mirror light deflecting device (DLP), and a type of energy saving light source.

26. An apparatus for transmitting data as in claim 25, wherein the plurality of light emitting devices produce lights comprising visible, inferred, and ultraviolet lights.

* * * * *